United States Patent [19]

Kuts

[11] 3,848,501
[45] Nov. 19, 1974

[54] FABRIC CUTTING

[75] Inventor: Mathew Kuts, Akron, Ohio

[73] Assignee: The B. F. Goodrich Company, New York, N.Y.

[22] Filed: July 20, 1973

[21] Appl. No.: 380,982

[52] U.S. Cl. ............... 83/471.3, 83/482, 83/488, 83/508
[51] Int. Cl. ............... B26d 1/20, B23d 19/02
[58] Field of Search ....... 83/471.3, 471.2, 483, 486, 83/487, 488, 508, 676, 578

[56] References Cited
UNITED STATES PATENTS

| | | | |
|---|---|---|---|
| 1,888,754 | 11/1932 | Alexander et al. | 83/488 X |
| 1,914,528 | 6/1933 | Reid | 83/508 |
| 1,975,219 | 10/1934 | Alexander et al. | 83/676 |
| 2,605,840 | 8/1952 | Parker | 83/483 |
| 2,638,856 | 5/1953 | Hubbar | 83/473 |
| 3,686,991 | 8/1972 | Fujimoto | 8/482 |
| 3,757,618 | 9/1973 | Kuts | 83/471.3 |

*Primary Examiner*—Donald R. Schran
*Attorney, Agent, or Firm*—Joseph Januszkiewicz; W. A. Shira, Jr.

[57] ABSTRACT

Bias cutting of rubberized fabric material wherein a carriage is reciprocated on a support frame, which frame may be adjusted angularly to determine the bias angle cut. A cutter support is mounted on the carriage for movement therewith but relative pivotal adjustment thereto about a vertical axis. Such cutter support journals for rotation a shaft that supports on one end a rotating cutter with a plurality of circumferentially spaced linear cutting edges. A spring on the other end of the shaft biases the cutters into shearing engagement with an anvil on a cutter guide over which the fabric material is to travel. The cutting action of the cutters is a shearing action as the cutter and carriage are reciprocated across the support frame. The cutter guide supports the anvil during its cooperative cutting action and such anvil is selectively interconnected to one of two lever means to facilitate the cuts in the direction of translational movement of the cutter to prevent interference with the material to be cut. Lever means may be provided to pivot the anvil out of the way to permit the indexing of the material and the return of the cutter and anvil during such indexing. A further modification provides means for moving the support, cutter means, and anvil up above the guide means to permit the indexing of the material to be cut as the cutter means is returned to its initial starting position.

8 Claims, 7 Drawing Figures

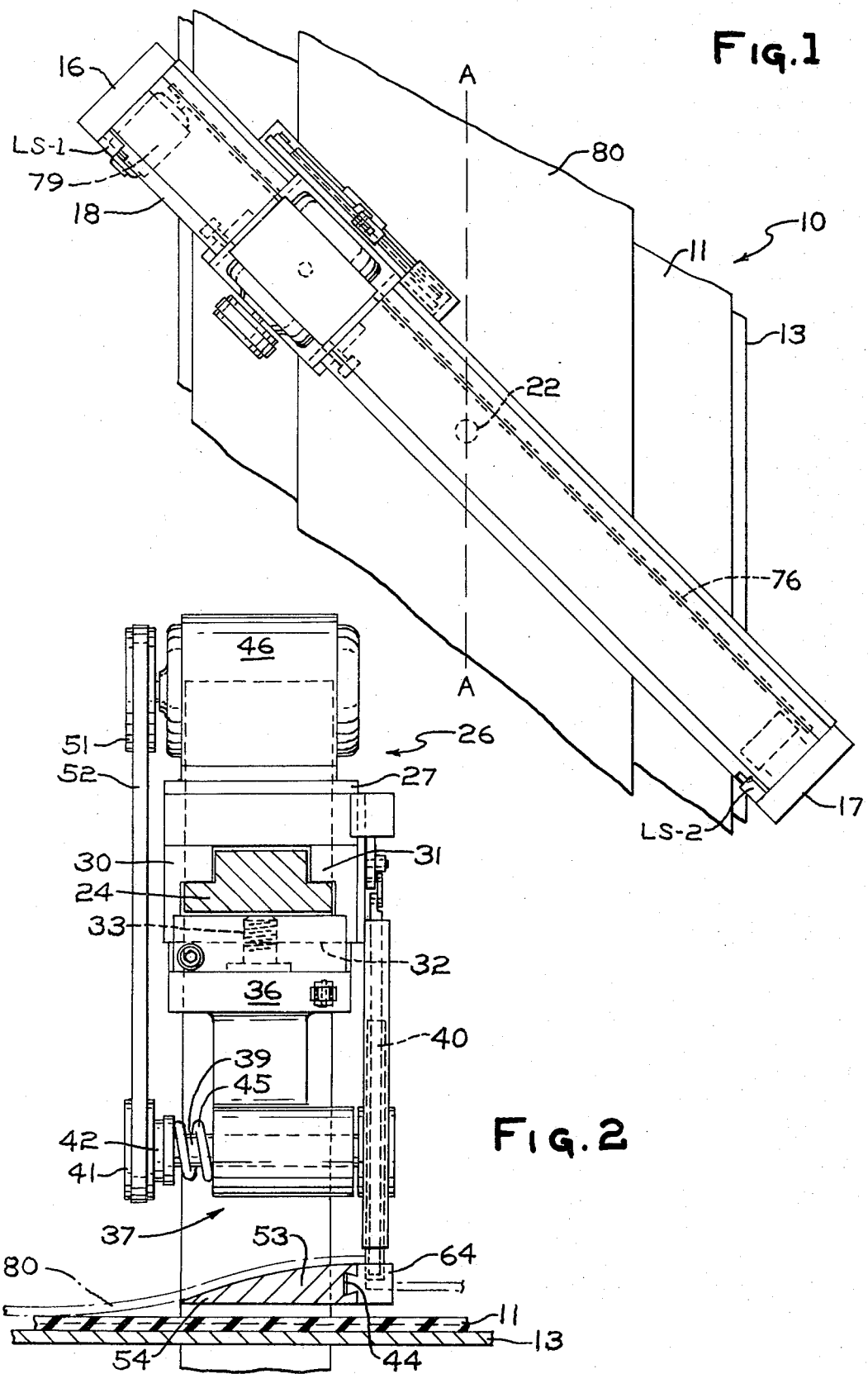

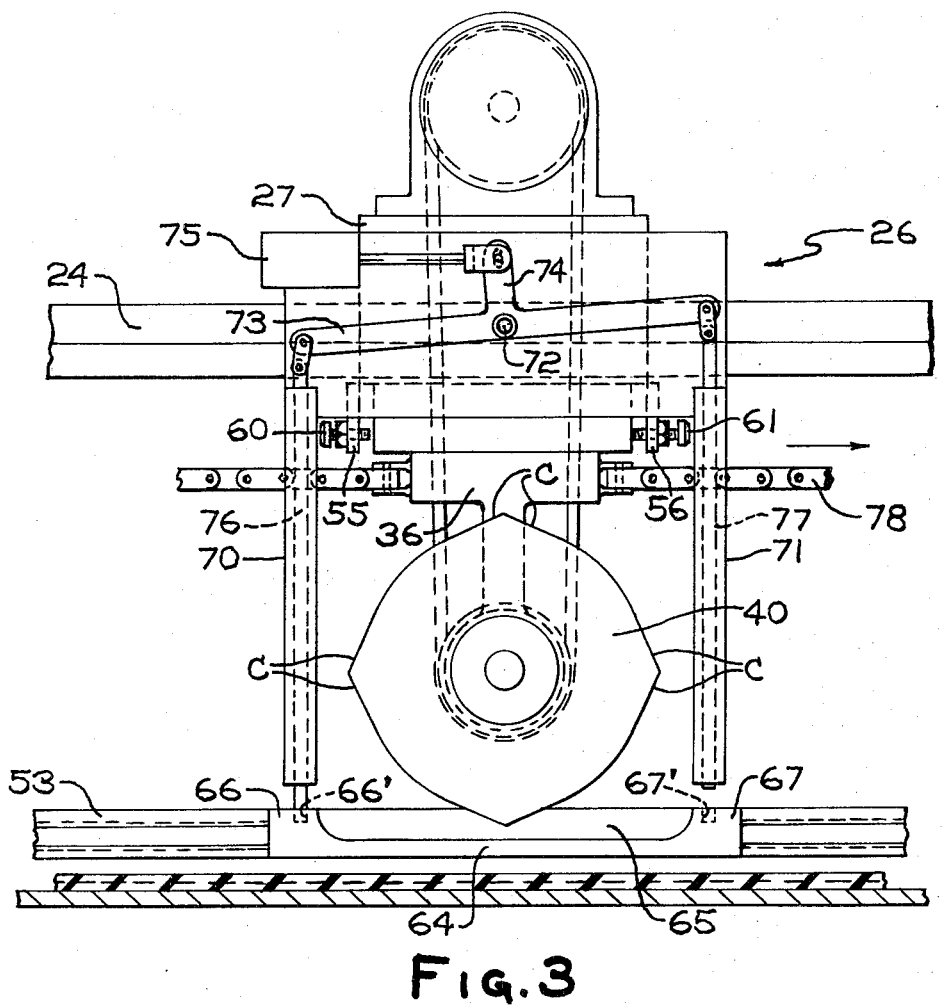
Fig. 3
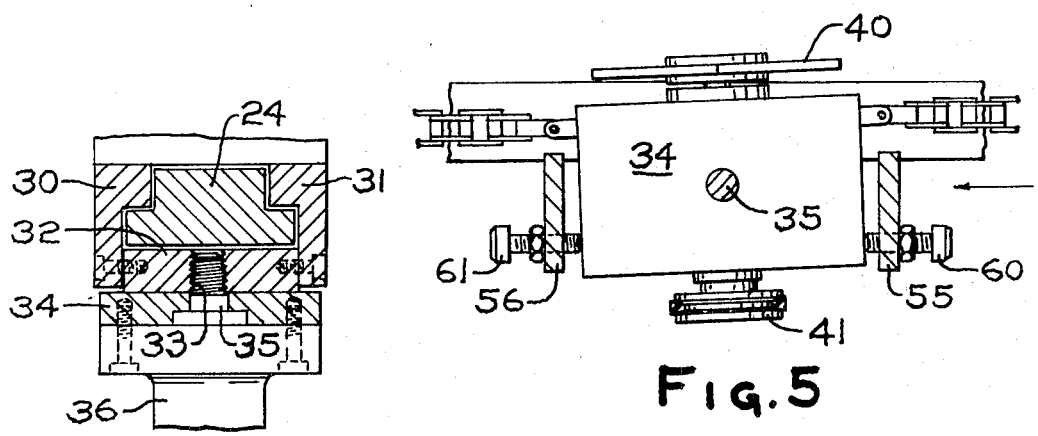
Fig. 4
Fig. 5

FABRIC CUTTING

BACKGROUND OF THE INVENTION

This invention relates to pneumatic tire manufacture and more particularly to a bias cutting apparatus for cutting ply stock material which is employed in the construction and manufacture of pneumatic tires.

In the manufacture of penumatic tires, one of the principal members used to build the tire carcass is a thin sheet of uncured rubber-like material known as a fabric, building ply or ply stock. In the manufacture of such ply stock, parallel cords of fabric are passed through a pair of rolls in cooperation with calendering rolls which work and calender unvulcanized rubber onto the parallel cords as they pass through the pinch rolls to form a continuous sheet with parallel strands or cord fabric embedded therein. Thereafter, such sheet material is bias cut into sections of fabric which are then spliced end to end to make a building ply or ply stock with cords therein located at a desired bias angle relative to the longitudinal center line of the ply stock. Layers of ply stock are applied to a tire building drum in such a manner that cord members of overlapping plies criss-cross with respect to the cord members above or below. The tire beads are then set against the ends of the ply stock and the plies are turned thereover. Additional plies, chafer strips, sidewall strip, breakers, overhead belts and a tread ply may be applied in varying orders, and stiched thereto. Such carcass is substantially a flat band, wherein the angle is measured between the cords and the circumferential line around the crown of the tire. In the case of pneumatic passenger tires, this may be approximately 60°. After the removal of such green tire, the tire is given a toroidal shape during vulcanization or on a second machine prior to vulcanization, wherein the angle after vulcanization may be 30° to 35° in the above example depending on many factors including drum set. The above description has generally referred to tires manufactured from fabric, however, the present invention is also directed to building plies which use non-extensible cord materials such as nylon and wire. In the processing of ply stock containing wire, processing has been difficult because of the inherent difficulty in cutting wire, which cutting is particularly compounded by the very low bias angle cutting on such stock wherein the cutters tend to push and displace the wire ends, which action distorts the stock.

In bias cutting rubberized cloth fabric, the conventional way of cutting is to use a pair of fingers that lift the fabric away from the conveyor belt on which it travels, so that a rapidly rotating cutter disk above the fingers cuts the fabric. The application of this apparatus to rubberized wire fabric is difficult and unsatisfactory. Where the speed of rotation of the rotating cutter is greater than the linear speed of the cutter as it moves across the material to be cut, the tendency is to gather the material due to the action of the rapidly rotating cutter; whereas if the rotational speed is less than the linear speed, the tendency is to push the fabric material ahead of the cutter. The rotating cutter of the present invention has a plurality of circumferentially spaced cutting edges which are linear, giving the cutter a downwardly cutting or shearing action in cooperation with a linearly movable anvil that is supported in its movement to assure a firm cutting action during the shearing cut. The cutting action of the instant invention is like that of a pair of tin snips wherein the cutting action is downward as it moves across the material to be cut and means are provided to move the cutting means and anvil out of the way of the material as it is advanced. The anvil during the cutting operation is firmly supported by the guide bar.

SUMMARY OF THE INVENTION

The present invention contemplates an apparatus that utilizes a carriage which is mounted on support frame for reciprocal movement on a guideway. The support frame may be adjusted to determine the bias angle to be cut. A cutter suppport member is mounted on the carriage for pivotal adjustment about a vertical axis to adjust the rotating cutter mounted thereon. Such cutter cooperates with a movable anvil to perform the shearing cut. The anvil is supported in its reciprocal movement on a transversely extending guideway. Means are provided to selectively engage one or the other end of the anvil to advance such anvil as it is moved along the guideway along with the rotating cutter to prevent interference with the material being cut. Alternatively the cutter and anvil may be integral and pivoted out of the way to return the cutter and anvil to the original position wherein the anvil is supported by the guideway for movement thereon while the material to be cut is advanced during such return movement. A modification of the apparatus is to have the cutter, carriage, anvil, and its associated mechanisms moved upwardly to permit movement of the material. On completion of the indexing of the material, the carriage, anvil and associate mechanisms are returned to a cutting position. The rotating cutter has a plurality of circumferentially spaced cutting edges, which edges are linear, giving the cutter a downward shearing action in cooperation with the traveling anvil, which anvil is supported against any thrust reaction from the cutter.

BRIEF DESCRIPTION OF THE DRAWINGS

FIG. 1 is a fragmentary plan view of a bias cutting apparatus with a portion of the conveyor shown.

FIG. 2 is a side elevational view of the cutter support, anvil, and guide bar with a portion shown in cross section.

FIG. 3 is a front elevational view of the carriage and cutting means of the bias cutting apparatus.

FIG. 4 is a fragmentary cross-sectional view of the cutter support with the guide rail in cross sectional.

FIG. 5 is a plan view of the cutter and cross-sectional view of the cutter support member.

DETAILED DESCRIPTION

Figure 6:
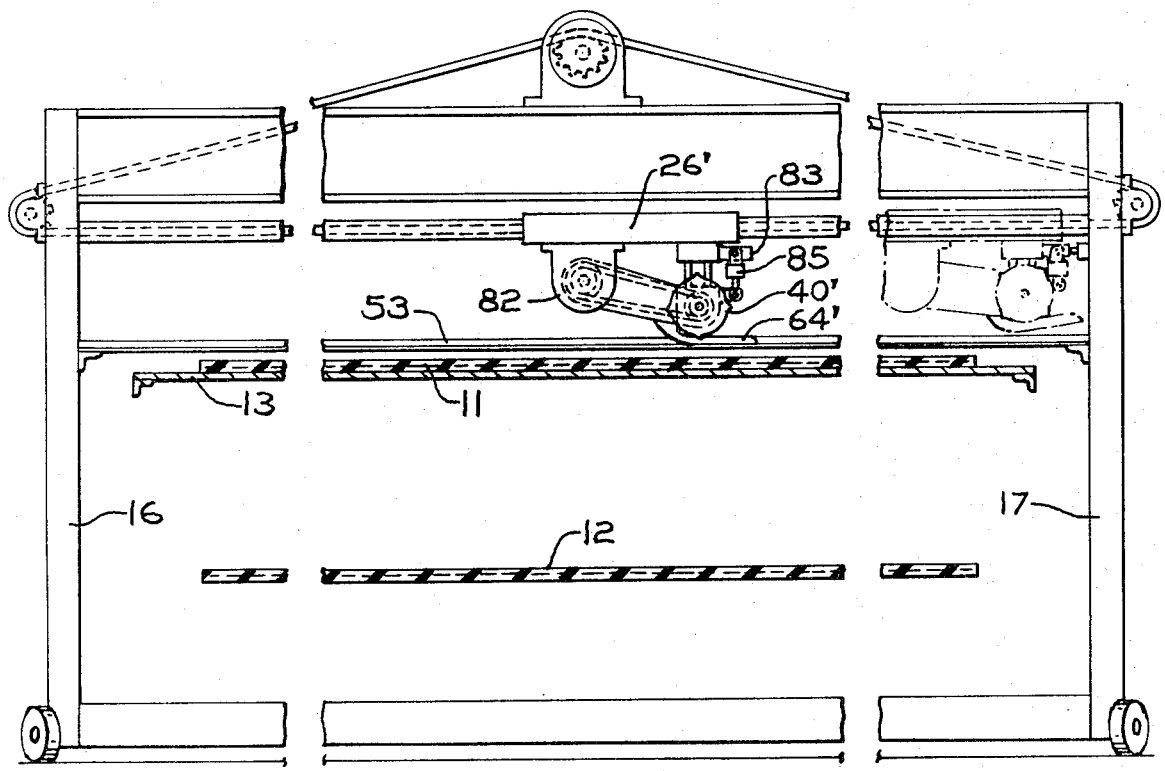
FIG. 6 is a front elevational view of a modified form of the cutter head.

Referring to the drawings wherein like reference characters designate like or corresponding parts throughout the several views, there is shown in FIG. 1 an endless conveyor belt 10 that is supported at spaced ends thereof by suitable rollers driven in the manner old and well-known in the art. Conveyor belt 10 has an upper conveying run 11 and a lower return run 12 (only shown in FIG. 6). Suitable guide and support means are provided to guide the belt in its travel. Supporting framework shown generally in FIG. 1 includes a pair of spaced upwardly extending support members 16 and 17 with a suitable horizontally extending guideway 24 therebetween. The framework has a pivot mounting 22 at its intermediate lower portion suitably journaled in the floor of the installation, about which the support framework can be pivotally adjusted. A plurality of spaced rollers are suitably mounted on respective lower end portions of the supporting framework to facilitate the angular adjustment of the supporting frame and the bias cutting apparatus to be described. Guideway 24 is suitably recessed on its respective upper side edge portions to provide an inverted T-shaped guide bar or guideways 24 as viewed in cross-section and shown in FIG. 2. Mounted for reciprocal movement on T-shaped guide bar or guideways 24 is a carriage 26 which includes an upper plate member 27, side plates 30, 31 (FIG. 4), and a lower plate 32. Lower plate 32 has a centrally threaded bore 33 (FIG. 4) such that a plate member 34 may be pivotally secured thereto as by a threaded bolt 35 which acts as a pivotal means. Secured to plate member 34 is a downward extending housing 36 which in cooperation with plate member 34 comprises a cutter support member 37 which is pivotally mounted on carriage 26. The lower portion of housing 36 journals for rotation a shaft 39, which has a cutter 40 secured to one end thereof for a purpose to be described. The other end portion of shaft 39 has a pulley 41 secured thereto along with a flange member 42. Encompassing shaft 39 between flange 42 and housing 36 is a compression spring 45 which biases cutter 40 leftwardly as viewed in FIG. 2 towards housing 36.

Mounted on upper plate member 27 is a variable speed motor 46 which has its output shaft connected to a pulley 51. A V-belt 52 trained about pulley 51 and pulley 41 transmits the output from motor 46 to cutter 40 rotating cutter 40 at a high speed.

Cutter support member 37 is pivotally adjusted on carriage 26 through the utilization of a pair of spaced plates or brackets 55 and 56 (FIG. 3), which brackets are suitably secured to lower plate 32 of carriage 26. The respective brackets or plates 55 and 56 have threaded bores which threadedly receive set screws 60 and 61, which in turn have lock nuts secured thereto. The lower plate member 34 through the setting on set screws 60 and 61 can be angularly adjusted relative to the lower plate 32. Such set screws 60 and 61 can be adjusted to maintain a fixed angular inclination between cutter 40 and anvil 64 or if the set screws are as shown in FIG. 3, the angular inclination is fixed; however, such inclination will be the same for each direction of travel of the cutter since the chain 78 will pivot the carriage about pivot bolt 35 and the stops 60 and 61 will limit the angular inclination in either direction.

Extending laterally between vertical support members 16 and 17 is a guide bar or guide plate 53 which has a leading edge 54 and a trailing edge as shown in FIG. 2. The trailing edge is recessed to provide a guidway 44 in which is mounted for reciprocal movement an anvil support member 64. Support member 64 has an anvil portion 65 and a pair of spaced bosses or enlarged portions 66 and 67. The enlarged portions 66 and 67 have bores 66' and 67' respectively. Secured to the respective end portions of carriage 26 are guide members 70 and 71. Each guide member 70 and 71 has a bore extending vertically therethrough in alignment with the respective bores 66' and 67' in the bosses or enlarged portions 66 and 67 of support member 64. Pivotally mounted as at 72 on carriage 26 is a crank arm 73. The intermediate portion of crank arm 73 has a vertically extending projection 74 which has its end portion pivotally secured to the piston rod of a pneumatic cylinder 75. The respective end portions of crank arm 73 are pivotally connected to rod means 76-77, which rod means are in alignment with bores 66' and 67' respectively. In the position shown in FIG. 3 rod means 76 engages bore 66' whereas rod means 77 is conditioned for engagement with the walls of bore 67' upon pressurization of head end of cylinder 75.

Suitably secured to housing 36 is a sprocket chain 78, which chain 78 is trained about suitable sprockets, one of which is connected to the output shaft of a reversible motor 79. Suitable limit switches (LS-1 and LS-2) are positioned in the support frame to rotate motor 79 in the proper direction and speed to reciprocate the carriage 26 and cutter 40 across the material to be cut that is supported by the upper conveying run 11. The cutting edge of the anvil 64 makes an acute angle with respect to the planar surface of cutter 40. Cutter 40 has a plurality of linear cutting surfaces indicated as C such that during the rotation of cutter 40 a portion of at least one linear surface is at all times in contact with the cutting edge 65 of the anvil 64.

In the operation of the apparatus described assume that the Line A—A in FIG. 1 represents longitudinal center line of the endless conveyor 10 and a fabric 80 is being moved therewith. The support frame is adjusted such that its guideway 24 makes an acute angle with respect to such longitudinal center line A—A. Such supporting frame is secured in any suitable manner to the floor or base to prevent movement about pivotal means 22. Endless conveyor belt 10 is intermittently energized to move a pre-selected amount of fabric 80 to the cutting apparatus in a manner old and well-known in the art. During such movement of the belt 10, the fabric 80 is moved up and over the guide plate 53 facilitated by the leading edge 54. Upon stopping of the conveyor belt 10, motor 79 is energized which thereby moves carriage 26 across guide plate 53 while cutter 40 is rotated at a high speed through the output shaft of motor 46 which transfers its output to endless belt 52 and thence to shaft 39. The cutting edge of cutter 40 makes a slight angle with respect to the cutting edge of anvil 65 through the adjustment of set screws 60 and 61 which maintains this adjustment for the entire cut as carriage 26 moves across the fabric. Such inclination of the cutting edge C of cutter 40 performs a snipping action which is a downward movement of the linear cutting edge C across the fabric such that with the wire cords embedded in the fabric are cut efficiently without displacing the wire strands or cord, wherein such action is similar to that of tin snips moving across a wire fabric. This type of action is similar to that of scissors which maintain point contact between the cutters only at the point of cutting and not a linear contact across the entire cutting edge of the anvil. This, in conjunction with the downward cutting action of the cutting edge, assures an efficient cut as the thrust of the cutter on the anvil is resisted by the guidway 53 supporting such anvil 64.

The rod end of cylinder 75 is pressurized, which action maintains the rod 76 in engagement with the bore 66' while maintaining a clearance space between rod 77 and bore 67' such that as the cutter 40 and carriage 26 is moved in a rightward direction as viewed in FIG. 3 such rod 77 will not interfere with the material to be cut yet anvil 64 is firmly supported by the guide bar 33 to provide an unyielding guide as cutter 40 rotates into shearing engagement with the anvil 64. Although anvil 64 is separate from the cutter 40 and carriage 26, such anvil is moved linearly with carriage 26 through its interconnection thereto either via rod 76 or 77 thus permitting the cutter 40 to cut in either direction of travel across the guide bar 53. Upon completion of the cut, motors 46 and 78 are deenergized, the fabric advanced, and then motors 46 and 78 are reversed, as by limit switches LS-2 to reverse the rotation of cutter 40 and to move the carriage 26 in a reverse direction to perform a further cut on fabric 80.

A modification of the cutting apparatus is shown in FIG. 6. Herein carriage 26' is longer in dimension but as in the FIGS. 1 and 2, such carriage 26' is suitably connected to a drive means which is operated to reciprocate or pull the carriage and cutter 40' first in a rightward direction as viewed in FIG. 6 and then a leftward direction. The variation of this embodiment is to have a motor 82 which drives cutter 40' mounted on the outboard end of carriage 26'. A bracket 83 on carriage 26' supports a hydraulic cylinder 85 which is connected to the housing that supports the cutter 40' and anvil 64' so that upon pressurization of the rod end of cylinder 85, cutter 40' and the housing that supports the cutter 40' along with the anvil 64' is pivoted outwardly away from the guideway permitting the periodic energization of conveyor 10 to advance the material while permitting the return of the cutter 40' and carriage 26' to the original starting position. During the return of carriage 26', anvil 64' is out of contact with the guideway; however, on completion of the return of anvil 64' to the starting position, the anvil 64' is firmly supported by guideway 53 from lateral trust and thereby enhances the shearing action.

Figure 7:
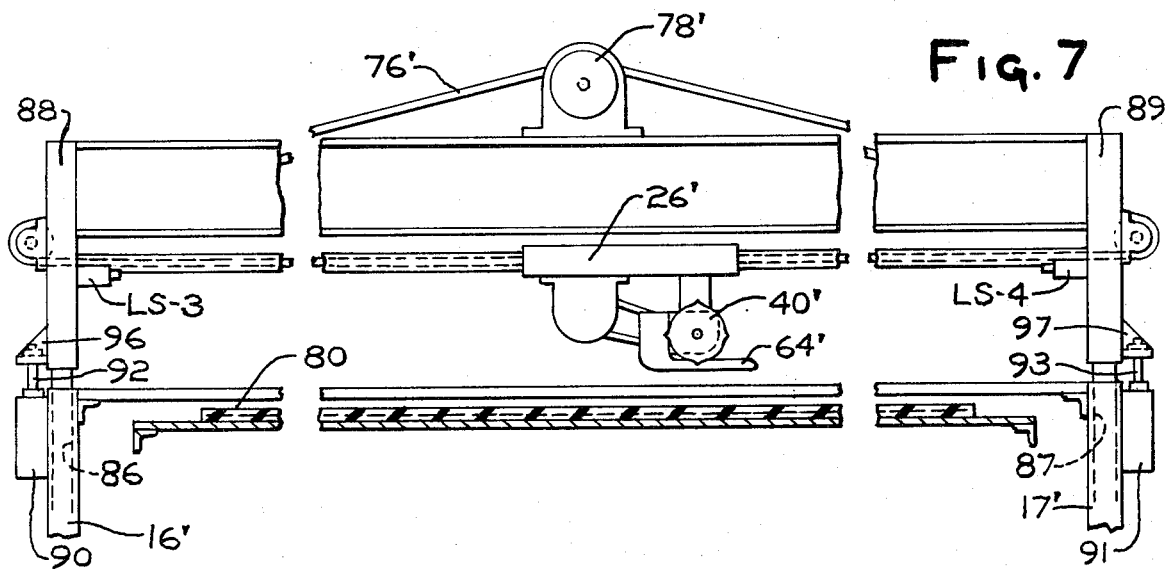
FIG. 7 is a front elevational view of another modified form of means for moving the cutter support member and the auxiliary members out of operative position.

FIG. 7 discloses a modified form of the invention shown in FIG. 6 wherein the respective spaced support members 16 and 17 are modified to include base portions 16' and 17' that have bores 86 and 87 respectively extending downwardly therein to receive vertical posts 88 and 89 respectively. Such posts 88 and 89 support the overhead structure including the cross beams that support the carriage 26', motor 78' that drives the chain 76' which in turn is operative to reciprocate such carriage 26'. Suitably secured to the support members 16' and 17' are hydraulic cylinders 90 and 91 having their piston rods 92 and 93 which are in turn secured to bracket 96 and 97. The brackets 96 and 97 are respectively secured to vertical posts 88 and 89 so that upon pressurization of the head end of cylinders 90 and 91 the overhead structure including carriage 26', cutter 40', and anvil 64' are moved vertical out of the way so that the material 80 can be moved past the cutter 40' and anvil 64' while such cutter 40' and anvil 64' are returned to their starting position in preparation for the succeeding cut. Suitable limit switches such as LS-3 and LS-4 are utilized to control the timing sequence of the operation.

Various modifications are contemplated and may obviously be resorted to by those skilled in the art without departing from the described invention, as hereinafter defined by the appended claims, as only a preferred embodiment thereof has been disclosed.

I claim:

1. A bias cutting apparatus for cutting rubberized fabric comprising a support frame, a carriage mounted on said support frame for reciprocal movement, power operated means connected to said carriage for reciprocating said carriage, a cutter means journaled on said carriage for rotation thereon, drive means mounted on said carriage operatively connected to said cutter means for rotating said cutter means, said cutter means having a plurality of spaced linear cutting edges, a guide plate secured to the lower portion of said support frame over which fabric is moved and under which a conveyor belt travels, anvil means operatively connected to said carriage for movement therewith, said anvil means supported against lateral movement on said guide plate and guide for longitudinal reciprocal movement on said guide plate, said anvil means having a linear cutting edge and a pair of spaced bosses, biasing means connected to said cutter means to bias a portion of the cutting edges of said cutter means into shearing contact with said linear cutting edge of said anvil means, drive means selectively interconnecting one or the other of said bosses to said carriage for reciprocal movement of said anvil therewith.

2. A bias cutting apparatus as set forth in claim 1 wherein said power operated means comprises a chain connected to a reversible motor for reciprocating said carriage, and said cutter means being pivotally mounted on said carriage for movement about a vertical axis to make an acute angle in plan view between said linear cutting edge of said anvil means and any one of said linear cutting edges of said cutter means.

3. A bias cutting apparatus as set forth in claim 2 wherein said drive means includes a pair of spaced rods selectively operable to engage said bosses.

4. A bias cutting apparatus as set forth in claim 3 wherein said carriage has a pair of spaced guide members, each guide member has a bore extending vertically therethrough, each of said bosses having an opening therein, said bores being in alignment with said openings, and each of said bores operative to guide one of said rods.

5. A bias cutting apparatus as set forth in claim 4 wherein lever means operatively interconnect said rods with cylinder means to selectively move one or the other of said rods into engagement with the walls of one of said openings.

6. A bias cutting apparatus as set forth in claim 5 wherein control means are connected to said rod means for moving said rods selectively in a vertical direction toward or away from said anvil means to maintain one or the other of said rod means out of contact with said anvil.

7. A bias cutting apparatus for cutting rubberized fabric comprising a support frame, a carriage mounted on said support frame for reciprocal movement, power operated means connected to said carriage for reciprocating said carriage, a cutter support member mounted on said carriage for reciporcal movement therewith, cutter means journaled on said cutter support member for rotation thereon, drive means mounted on said carriage operatively connected to said cutter means for rotating said cutter means, a guide plate secured to the lower portion of said support frame over which fabric is moved and under which a conveyor belt travels, said guide plate having a guideway thereon, anvil means mounted on said guideway for linear movement on said guideway, lever means on said carriage operative upon actuation to engage said anvil for moving said anvil with said cutter and said carriage, said cutter means having a plurality of circumferentially spaced cutting edges that are cooperative with said anvil means to perform a shearing action on fabric therebetween, a biasing means connected to said cutter means to bias said cutting edges into shearing contact with said anvil as said cutting edges approach said anvil.

8. A bias cutting apparatus for cutting rubberized fabric comprising a support frame, a guide bar secured to said support frame, a carriage mounted on said support frame for reciprocal movement on said guide bar, power operated means connected to said carriage for reciprocating said carriage, cutter means journaled on said carriage for rotation thereon, drive means mounted on said carriage operatively connected to said cutter means for rotating said cutter means, a guide plate secured to the lower portion of said support frame over which fabric is moved, anvil means secured to said carriage for movement therewith, said anvil means guided for reciprocal movement on said guide plate, said anvil means having a linear cutting edge and a pair of spaced bosses, said bosses mounted on either side of said linear cutting edge, biasing means connected to said cutter means to bias a portion of the cutting edges of said cutter means into shearing contact with said linear cutting edge of said anvil means, and means selectively operative to interconnect said carriage to said anvil via one of said bosses.

* * * * *